United States Patent
Park et al.

(10) Patent No.: US 10,468,996 B2
(45) Date of Patent: Nov. 5, 2019

(54) TRIBOELECTRIC GENERATION DEVICE

(71) Applicants: SAMSUNG ELECTRONICS CO., LTD., Suwon-si, Gyeonggi-do (KR); RESEARCH & BUSINESS FOUNDATION SUNGKYUNKWAN UNIVERSITY, Suwon-si, Gyeonggi-do (KR)

(72) Inventors: Young-jun Park, Suwon-si (KR); Sang-woo Kim, Yongin-si (KR); Yun-kwon Park, Dongducheon-si (KR); Wan chul Seung, Yongin-si (KR); Hong-joon Yoon, Goyang-si (KR); Keun young Lee, Suwon-si (KR); Jeong hwan Lee, Gumi-si (KR); Ju-hyuck Lee, Suwon-si (KR)

(73) Assignee: SAMSUNG ELECTRONICS CO., LTD., Suwon-si, Gyeonggi-do (KR)

(*) Notice: Subject to any disclaimer, the term of this patent is extended or adjusted under 35 U.S.C. 154(b) by 305 days.

(21) Appl. No.: 15/532,643

(22) PCT Filed: Nov. 27, 2015

(86) PCT No.: PCT/KR2015/012847
§ 371 (c)(1),
(2) Date: Jun. 2, 2017

(87) PCT Pub. No.: WO2016/089046
PCT Pub. Date: Jun. 9, 2016

(65) Prior Publication Data
US 2018/0013359 A1    Jan. 11, 2018

(30) Foreign Application Priority Data
Dec. 3, 2014 (KR) .................. 10-2014-0172379

(51) Int. Cl.
*H02N 1/04* (2006.01)
*H01B 1/20* (2006.01)
(Continued)

(52) U.S. Cl.
CPC .............. *H02N 1/04* (2013.01); *H01B 1/20* (2013.01); *H02N 1/08* (2013.01); *H02N 1/10* (2013.01)

(58) Field of Classification Search
CPC ... H02N 1/04; H02N 1/10; H02N 1/08; H01B 1/20
See application file for complete search history.

(56) References Cited

U.S. PATENT DOCUMENTS

| 4,917,810 | A | * | 4/1990 | Tsunooka | ................ | H01L 41/37 |
| | | | | | | 252/62.9 R |
| 5,403,788 | A | * | 4/1995 | Nishida | ................ | H01L 41/183 |
| | | | | | | 252/62.9 PZ |

(Continued)

FOREIGN PATENT DOCUMENTS

| CN | 103973155 | 8/2014 |
| JP | 2011-015503 | 1/2011 |

(Continued)

OTHER PUBLICATIONS

Search Report and Written Opinion dated Apr. 8, 2016 in counterpart International Patent Application No. PCT/KR2015/012847.

*Primary Examiner* — Edgardo San Martin
(74) *Attorney, Agent, or Firm* — Nixon & Vanderhye, P.C.

(57) ABSTRACT

The present disclosure enables materials of a triboelectric charging member to exhibit a characteristic of increased surface charge density, thereby improving output of a triboelectric generating device. Accordingly, the present disclosure provides a triboelectric generating device showing improved output without increasing a size of the triboelec- (Continued)

tric generating device or without increasing amounts of materials required for the triboelectric generating device. An embodiment of a triboelectric generating device provided according to a first aspect of the present disclosure includes a first electrode; a first charging layer formed on the first electrode; and a second electrode disposed on the first charging layer, wherein the first charging layer and the second electrode are arranged such that an interface between the first charging layer and the second electrode forms a frictional interface, and the first charging layer includes a ferroelectric polymer matrix and ferroelectric inorganic particles dispersed in the ferroelectric polymer matrix.

15 Claims, 3 Drawing Sheets

(51) Int. Cl.
*H02N 1/08* (2006.01)
*H02N 1/00* (2006.01)
*H02N 1/10* (2006.01)

(56) References Cited

U.S. PATENT DOCUMENTS

| 10,003,281 | B2* | 6/2018 | Kim | H02N 1/04 |
| 10,050,562 | B2* | 8/2018 | Kim | H02N 2/18 |
| 10,103,648 | B2* | 10/2018 | Park | H02N 1/04 |
| 2013/0049531 | A1 | 2/2013 | Wang et al. | |
| 2014/0246950 | A1 | 9/2014 | Wang et al. | |
| 2015/0194911 | A1* | 7/2015 | Kim | H02N 1/04 310/310 |
| 2016/0164434 | A1* | 6/2016 | Kim | H02N 1/04 310/310 |

FOREIGN PATENT DOCUMENTS

| KR | 10-1398708 | 5/2014 | | |
| KR | 10-1417855 | 7/2014 | | |
| KR | 2018080778 A | * 7/2018 | | H02N 1/04 |

* cited by examiner

<EXAMPLE 1>

<EXAMPLE 4>

US 10,468,996 B2

TRIBOELECTRIC GENERATION DEVICE

This application is the U.S. national phase of International Application No. PCT/KR2015/012847 filed Nov. 27, 2015 which designated the U.S. and claims priority to KR Patent Application No. 10-2014-0172379 filed Dec. 3, 2014, the entire contents of each of which are hereby incorporated by reference.

TECHNICAL FIELD

The present disclosure relates to an energy harvesting device by vibration (mechanical energy). More particularly, the present disclosure relates to a triboelectric generating device that generates electricity through friction.

BACKGROUND ART

A technology of generating triboelectricity is a technology of generating electricity from a potential difference induced by friction generated by external pressure or vibration at an interface between different dielectric materials or at an interface between a dielectric material and a metal. The technology of generating triboelectricity is known to provide an output that is about 10 times to about 100 times that provided via technology for generating piezoelectricity. However, there remains a need to improve output density of a triboelectric generating device. Output of a triboelectric generating device is generally determined by characteristics of a triboelectric material (work function, ionization trend, chemical potential, etc.) and compositions and surface structures of a triboelectric member. Therefore, in generating induction electricity from static electricity induced by friction, the existing triboelectric generating devices show a limitation in output due to electrification characteristics of existing triboelectric materials. Many studies have been conducted to overcome the limitation in output, and most studies have been based on a technique of varying a structure and a surface area of the triboelectric member and mainly aimed at generating more friction in order to increase an amount of static electricity produced. However, these techniques increase a size of the triboelectric generating device, and also increase amounts of materials required for the triboelectric generating device.

DETAILED DESCRIPTION OF THE INVENTION

Technical Problem

The present disclosure enables materials of a triboelectric charging member to exhibit a characteristic of increased surface charge density, thereby improving output of a triboelectric generating device. Accordingly, the present disclosure provides a triboelectric generating device showing improved output without increasing a size of the triboelectric generating device or without increasing amounts of materials required for the triboelectric generating device.

Technical Solution

An embodiment of a triboelectric generating device provided according to an aspect of the present disclosure includes:
  a first electrode;
  a first charging layer formed on the first electrode; and
  a second electrode disposed on the first charging layer,
    wherein the first charging layer and the second electrode are arranged so that an interface between the first charging layer and the second electrode forms a friction interface, and
  the first charging layer includes a ferroelectric polymer matrix and ferroelectric inorganic particles dispersed in the ferroelectric polymer matrix.

Advantageous Effects of the Invention

The present disclosure may control surface charge density of materials of a triboelectric charging member to improve an output value of a triboelectric generating device, and therefore, embodiments of the triboelectric generating device of the present disclosure may achieve improved output with the same thickness and area. That is, a first charging layer includes a ferroelectric polymer matrix and ferroelectric inorganic particles dispersed in the ferroelectric polymer matrix. The ferroelectric polymer matrix exhibits interfacial polarization due to external pressure. The ferroelectric inorganic particles dispersed in the ferroelectric polymer matrix causes a local polarization effect through strain generated by interfacial friction and deformation, leading to an additional increase of a potential difference and resulting in improvement of the overall output of the triboelectric generating device. Embodiments of the triboelectric generating device of the present disclosure may be manufactured in the form of a flexible film, and embedded in a vibrating structure, a strap, a buckle, etc. to generate electricity by using friction generated by vibration or human motion.

BEST MODE

Figure 1:
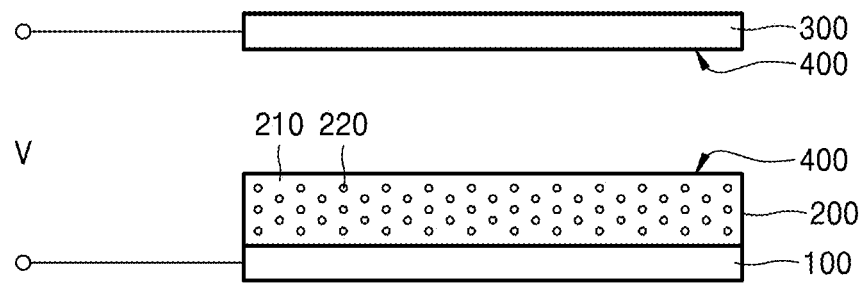
FIG. 1 is a cross-sectional view of an embodiment of a triboelectric generating device provided according to a first aspect of the present disclosure.

Hereinafter, referring to FIG. 1, an embodiment of a triboelectric generating device provided according to a first aspect of the present disclosure will be described in more detail. FIG. 1 is a cross-sectional view of an embodiment of the triboelectric generating device provided according to the first aspect of the present disclosure.

The embodiment of FIG. 1 includes a first electrode 100; a first charging layer 200 formed on the first electrode 100; and a second electrode 300 disposed on the first charging layer 200. The first charging layer 200 and the second electrode 300 are arranged such that an interface between the first charging layer 200 and the second electrode 300 forms a frictional interface 400. The first charging layer 200 includes a ferroelectric polymer matrix 210 and ferroelectric inorganic particles 220 dispersed in the ferroelectric polymer matrix 210.

The first electrode 100 may include any electrically conductive material. The first electrode 100 may be, for example, one or more selected from the group consisting of aluminium (Al), copper (Cu), magnesium (Mg), tungsten (W), iron (Fe), platinum (Pt), gold (Au), silver (Ag), tantalum (Ta), titanium (Ti), palladium (Pd), ruthenium (Ru), alloys thereof, carbon nanotube, graphene, ITO (indium tin oxide), tantalum nitride (TaN), titanium nitride (TiN), and conductive polymers (specifically, PCBM([6,6]-phenyl-C85 butyric acid methyl ester)-based polymers).

The first charging layer 200 is formed on the first electrode 100. Further, the first charging layer 200 includes the ferroelectric polymer matrix 210; and the ferroelectric inorganic particles 220 dispersed in the ferroelectric polymer matrix 210.

Ferroelectricity refers to a property in which a nonconductor or a dielectric material exhibits spontaneous polarization (separation of the center of a positive electric charge and the center of a negative electric charge such that one side of the crystal is positive and the opposite side negative). Ferroelectric materials may be composed of structural units which are tiny electric dipoles. Here, the electric dipoles mean that the centers of a unit positive charge and of a unit negative charge are spaced apart in a very small distance from each other. In crystals, these electric dipoles spontaneously line up in clusters called "domains".

The ferroelectric polymer matrix 210 may include, for example, one or more polymers selected from the group consisting of polyvinylidene fluoride (PVDF), polydimethylsiloxane (PDMS), polyimide, P(VDF-TrFE) (poly(vinylidenefluoride-co-trifluoroethylene)), P(VDF-TrFECFE) (poly(vinylidenefluoride-trifluoroethylene-chlorofluoroethylene)), and P(VDF-HFP) (poly(vinylidenefluoride-hexafluoropropylene)).

The ferroelectric inorganic particles 220 are dispersed in the ferroelectric polymer matrix 210. The ferroelectric inorganic particles 220 may include, for example, one or more selected from the group consisting of PZT (lead zirconate titantate), barium titanate ($BaTiO_3$), zinc oxide (ZnO), gallium nitride (GaN), aluminium nitride (AlN), $PbTiO_3$, triglycine sulfate (($NH_2CH_2COOH)_3.H_2SO_4$), lithium tantalate ($LiTaO_3$), and lithium niobate ($LiNbO_3$).

An average particle size of the ferroelectric inorganic particles 220 may be, for example, about 80 nm to about 800 nm. When the average particle size of the ferroelectric inorganic particles 220 is too small, generation of polarization through external strain may be slight or small. When the average particle size of the ferroelectric inorganic particles 220 is too large, the inorganic particles 220 may be unevenly dispersed, and therefore, it may be difficult to expect uniform polarization distribution.

An amount of the ferroelectric inorganic particles 220 in the first charging layer 200 may be, for a typical example, about 1 part by weight to about 40 parts by weight, based on 100 parts by weight of the ferroelectric polymer matrix. When the amount of the ferroelectric inorganic particles is too small, an effect of improving the potential difference may be insignificant, or localized distribution may occur. When the amount of the ferroelectric inorganic particles is too large, the effect of improving the potential difference may be reduced, and a composite including the polymer matrix and the inorganic particles may be unstably formed such that a binding force of the first charging layer 200 itself is reduced.

The ferroelectric polymer matrix 210 exhibits an interfacial polarization property due to external pressure. The ferroelectric inorganic particles 220 dispersed in the ferroelectric polymer matrix 210 cause a local polarization effect through strain generated by interfacial friction and deformation, leading to an additional increase of the potential difference.

For example, a method of forming the first charging layer 200 on the first electrode 100 may include applying a dispersion solution for forming the first charging layer onto the first electrode 100, wherein the dispersion solution includes the ferroelectric polymer; the ferroelectric inorganic particles; and a solvent; and then removing the solvent from the applied dispersion solution for forming the first charging layer. The solvent may be any solvent, as long as it is able to dissolve the ferroelectric polymer and disperse the ferroelectric inorganic particles. The solvent may include, for example, one or more selected from the group consisting of dimethylformamide (DMF), acetone, and N-methylpyrrolidone (NMP). For example, an amount of the solvent used may be about 50 parts by weight to about 95 parts by weight, based on 100 parts by weight of a total of the ferroelectric polymer and the ferroelectric inorganic particles. The removing of the solvent from the applied dispersion solution for forming the first charging layer may be performed by, for example, volatilization or evaporation. The first charging layer 200 formed through these procedures may be attached onto the first electrode 100.

The second electrode 300 is disposed on the first charging layer 200. The second electrode 300 may include an arbitrary material which is able to cause triboelectrification of the first charging layer 200 through friction between the second electrode 300 and the first charging layer 200. The second electrode 300 may be, for example, one or more selected from the group consisting of aluminum (Al), copper (Cu), magnesium (Mg), tungsten (W), iron (Fe), platinum (Pt), gold (Au), silver (Ag), tantalum (Ta), titanium (Ti), palladium (Pd), ruthenium (Ru), alloys thereof, carbon nanotube, graphene, ITO (indium tin oxide), tantalum nitride (TaN), titanium nitride (TiN), and conductive polymers (specifically, for example, PCBM([6,6]-phenyl-C85 butyric acid methyl ester)-based polymers).

The first charging layer 200 and the second electrode 300 are arranged such that an interface between the first charging layer 200 and the second electrode 300 forms a frictional interface 400. Here, forming the frictional interface 400 means that the first charging layer 200 and the second electrode 300 may be in contact with each other without attaching or fixing to each other. As the first charging layer 200 and the second electrode 300 contact each other, the second electrode 300 causes triboelectrification of the first charging layer 200, leading to the accumulation of charges of opposite polarities in the first charging layer 200 and the second electrode 300. As a result, a potential difference is formed between the first electrode 100 and the second electrode 300. The ferroelectric inorganic particles 220 dispersed in the ferroelectric polymer matrix 210 may cause a local polarization effect through strain generated by interfacial friction and deformation. Accordingly, the ferroelectric inorganic particles 220 dispersed in the ferroelectric polymer matrix 210 may bring about a remarkable increase in the potential difference which is formed between the first electrode 100 and the second electrode 300, compared to the case of the first charging layer 200 including only the ferroelectric polymer matrix 210. Meanwhile, when a desired size of the potential difference is formed between the first electrode 100 and the second electrode 300, electrical energy generated by triboelectrification may be withdrawn by connecting an external load to the first electrode 100 and the second electrode 300. Next, the potential difference due to triboelectrification may accumulate again between the first electrode 100 and the second electrode 300 by blocking the first electrode 100 and the second electrode 300 from the external load. By repeating this process, alternating current generation becomes possible. Further, in another embodiment, the first charging layer 200 and the second electrode 300 may be arranged so that contact and non-contact with each other may alternately repeat. Further, in still another embodiment, when both surfaces in contact with each other are rubbed, both surfaces are charged with different polarities from each other, and the potential difference may be generated. Further, in still another embodiment, by varying a distance between both surfaces in contact with each other, interactions between charges present in both surfaces in contact with each other may change at a frictional interface, and these changes in the interactions may cause a flow of charge through an external circuit. To generate a continuous flow of charge, when the distance between both surfaces at the frictional interface is continuously varied (that is, the distance is alternately widened and narrowed), a direction of the current may be changed to create alternating current.

A thickness of the first charging layer 200 may be, for example, about 0.1 μm to about 300 μm. Preferably, the thickness of the first charging layer 200 may be about 1 μm to about 150 μm. More preferably, the thickness of the first charging layer 200 may be about 10 μm to about 100 μm. When the thickness of the first charging layer 200 is too small, it is difficult to sufficiently absorb the strain, and dispersion of nanoparticles may be not easy. When the thickness of the first charging layer 200 is too thick, the triboelectric effect may be reduced.

In another embodiment of the triboelectric generating device provided according to the first aspect of the present disclosure, an amount of the ferroelectric inorganic particles 220 in the first charging layer 200 may be about 1 part by weight to about 40 parts by weight, based on 100 parts by weight of the ferroelectric polymer matrix. More preferably, the amount of the ferroelectric inorganic particles 220 in the first charging layer 200 may be about 1 part by weight to about 20 parts by weight, based on 100 parts by weight of the ferroelectric polymer matrix. Much more preferably, the amount of the ferroelectric inorganic particles 220 in the first charging layer 200 may be about 3 parts by weight to about 18 parts by weight, based on 100 parts by weight of the ferroelectric polymer matrix. As revealed in the present disclosure, when the amount of the ferroelectric inorganic particles 220 in the first charging layer 200 is within the above range, it is observed that the potential difference formed between the first electrode 100 and the second electrode 300 is critically increased.

In still another embodiment of the triboelectric generating device provided according to the first aspect of the present disclosure, the amount of the ferroelectric inorganic particles in the first charging layer may exhibit a gradient varying in a thickness direction of the first charging layer. Preferably, as the distance from the frictional interface increases, a distribution of the ferroelectric inorganic particles in the ferroelectric polymer matrix may gradually increase from a sparse state to a dense state. When the distribution of the ferroelectric inorganic particles gradually increases from a sparse state to a dense state, charges of both surfaces of the frictional interface are induced by triboelectrification of the ferroelectric polymer, whereas the ferroelectric inorganic particles generate the potential difference by ferroelectric polarization rather than by triboelectrification, thereby additionally increasing the potential difference generated by triboelectrification of the ferroelectric polymer. When the distribution of the ferroelectric inorganic particles gradually increases from a sparse state to a dense state, polarizations by the ferroelectric inorganic particles may be serially arranged so as to amplify the effect of generating the potential difference by ferroelectric polarization.

For example, the first charging layer may be a laminate of at least two sub-charging layers which are different from each other in terms of a content of the inorganic particles thereof.

For example, a sub-charging layer having the lowest content of the inorganic particles may be disposed so as to form the frictional interface (that is, the sub-charging layer having the lowest content of the inorganic particles may be disposed to face the second electrode). In this case, the content of the inorganic particles at the frictional interface of the first charging layer becomes lower than the content of the inorganic particles at another region of the first charging layer. As a result, a difference in local polarization distribution may be caused, thereby obtaining an effect of additionally increasing an effective potential difference between both surfaces of the frictional interface.

Figure 2:
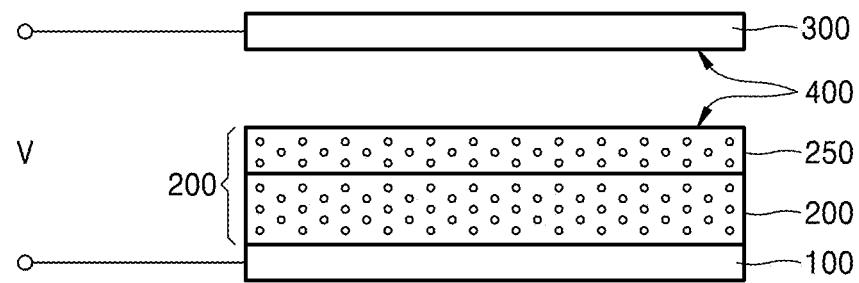
FIG. 2 is a cross-sectional view of an embodiment wherein a sub-charging layer having a lowest content of inorganic particles is arranged to form a frictional interface.

FIG. 2 is a cross-sectional view of an embodiment wherein the sub-charging layer having the lowest content of inorganic particles is arranged to form the frictional interface. In the embodiment of FIG. 2, the first charging layer 200 includes a first sub-charging layer 250 having a relatively low content of the inorganic particles; and a second sub-charging layer 260 having a relatively high content of the inorganic particles. In this regard, the first sub-charging layer 250 faces the second electrode 300. Therefore, the content of the inorganic particles at the frictional interface 400 of the first charging layer 200 becomes lower than the content of the inorganic particles at another region (i.e. the second sub-charging layer 260) of the first charging layer 200.

The content of the ferroelectric inorganic particles in the first charging layer having a gradient varying in the thickness direction of the first charging layer may be confirmed by electron microscopy images of both surfaces (i.e., the frictional interface 400; and a surface contacting the first electrode 100) of the first charging layer. For example, when the number of the inorganic particles observed in the electron microscopy image of the frictional interface 400 is smaller than the number of the inorganic particles observed in the electron microscopy image of the surface in contact with the first electrode 100, it may be confirmed that the content of the ferroelectric inorganic particles in the first charging layer has a gradient varying in the thickness direction of the first charging layer. The electron microscopy image of the surface in contact with the first electrode 100 may be taken after detaching the first charging layer 200 from the first electrode 100.

In the embodiment of FIG. 2, for example, the first charging layer 200 may be formed by applying a dispersion solution for forming the second sub-charging layer 260 including the ferroelectric polymer, a relatively large amount of the ferroelectric inorganic particles, and a solvent onto the first electrode 100; forming the second sub-charging layer 260 by removing the solvent from the applied dispersion solution for forming the second sub-charging layer 260; applying the dispersion solution for forming the first sub-charging layer 250 including the ferroelectric polymer, a relatively small amount of the ferroelectric inorganic particles, and a solvent onto the second sub-charging layer

260; and forming the first sub-charging layer 250 by removing the solvent from the applied dispersion solution for forming the first sub-charging layer 250.

A content of the ferroelectric inorganic particles in the sub-charging layer having the lowest content of the inorganic particles may be, for example, gradually increased from 0 parts by weight to about 40 parts by weight, based on 100 parts by weight of the ferroelectric polymer matrix of the corresponding sub-charging layer. The content of the ferroelectric inorganic particles in the sub-charging layer having the lowest content of the inorganic particles may be, for example, 0 parts by weight to about 18 parts by weight, based on 100 parts by weight of the ferroelectric polymer matrix of the corresponding sub-charging layer.

A content of the ferroelectric inorganic particles in a sub-charging layer other than the sub-charging layer having the lowest content of the inorganic particles may be, for example, about 1 part by weight to about 40 parts by weight, based on 100 parts by weight of the ferroelectric polymer matrix of the corresponding sub-charging layer.

A thickness of the sub-charging layer having the lowest content of the inorganic particles may be, for example, about 0.1 µm to about 300 µm.

A total thickness of a sub-charging layer or sub-charging layers other than the sub-charging layer having the lowest content of the inorganic particles may be, for example, about 0.01 µm or more.

In still another embodiment of the triboelectric generating device provided according to the first aspect of the present disclosure, the triboelectric generating device may further include the second charging layer formed on the second electrode, wherein the second charging layer may include the second ferroelectric polymer matrix, and the first charging layer and the second charging layer may be arranged so that the interface between the first charging layer and the second charging layer forms a frictional interface.

Figure 3:
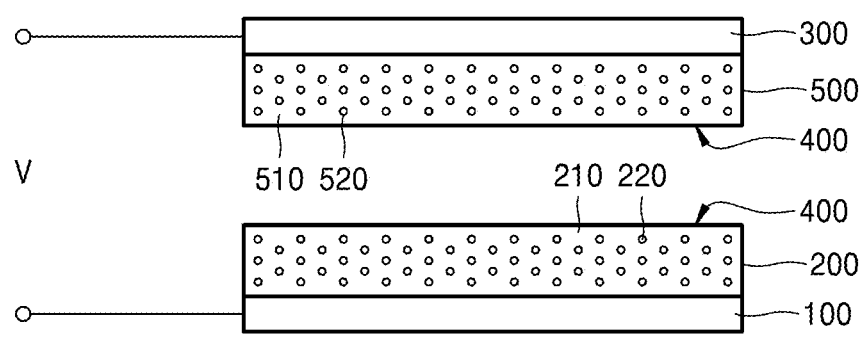
FIG. 3 is a cross-sectional view of an embodiment further including a second charging layer.

FIG. 3 is a cross-sectional view of an embodiment further including the second charging layer. A second charging layer 500 may be further formed on the second electrode 300. The second charging layer 500 may include a second ferroelectric polymer matrix 510. The first charging layer 200 and the second charging layer 500 may be arranged such that an interface between the first charging layer 200 and the second charging layer 500 forms a frictional interface 400.

Addition of the second charging layer 500 allows the second charging layer 200 to selectively contain a dielectric material having a relatively high potential difference from the first charging layer 500. Further, by surface treatment and lamination of the second charging layer 500 as well as the first charging layer 200, a specific surface area of the frictional interface may be further increased, thereby obtaining an effect of charge being further increased.

In another embodiment, the second charging layer 500 may further include ferroelectric inorganic particles 520 dispersed in the second ferroelectric polymer matrix 510.

In still another embodiment, a content of the ferroelectric inorganic particles in the second charging layer 500 may exhibit a gradient varying in a thickness direction of the second charging layer. For example, the second charging layer may be a laminate of at least two sub-charging layers which are different from each other in terms of a content of the inorganic particles thereof. For example, a sub-charging layer having the lowest content of the inorganic particles may be disposed so as to form the frictional interface (that is, the sub-charging layer having the lowest content of the inorganic particles may be disposed facing the first charging layer 200). In this case, the content of the inorganic particles at the frictional interface of the second charging layer becomes lower than the content of the inorganic particles at another region of the second charging layer.

MODE OF THE INVENTION

Examples

Example 1-10 Parts by Weight of Inorganic Particles (Based on 100 Parts by Weight of Polymer Matrix)

First, 0.8 g of P(VDF-TrFE) (France, PIEZOTECH, P(VDF-TrFE) copolymer powder 70/30% mol, 1.8 kg/m$^3$), 0.08 g of barium titanate (BaTiO$_3$) (USA, Sigma Aldrich, Barium titanate (IV), <3 µm), and DMF (dimethylformamide) (USA, Sigma Aldrich, N,N-Dimethylformamide) (use of solvent: 60 parts by weight, based on 100 parts by weight of a total of the inorganic particles and the polymer matrix) were mixed to prepare a dispersion solution for forming a first charging layer.

Figure 4:
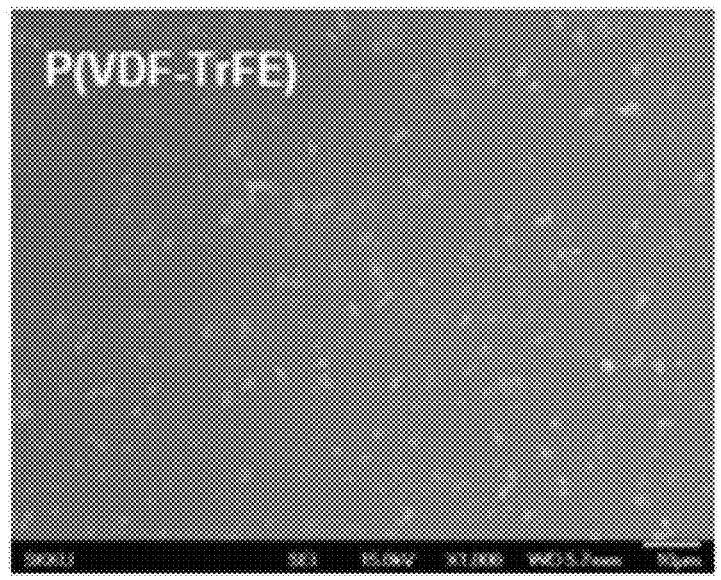
FIG. 4 shows scanning electron microscopy images of the surfaces of first charging layers obtained in Examples 1 and 4.
Figure 4:
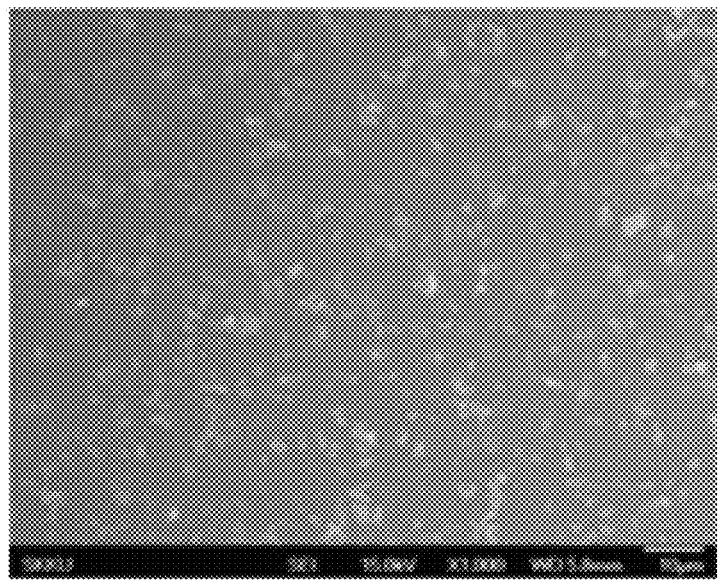

Next, the dispersion solution for forming a first charging layer was spin-coated onto a first electrode (ITO thin film having a thickness of 200 µm formed on a PEN (polyethylene naphthalate) substrate having a thickness of 200 µm), and then dried at 80° C. for 10 minutes to form a first charging layer having a thickness of 10 µm. A scanning electron microscopy image of a surface of the first charging layer thus formed is shown in FIG. 4. In FIG. 4, white spots are barium titanate (BaTiO$_3$) particles.

Next, a second electrode (aluminum foil having a thickness of 100 µm) was disposed on the first charging layer to manufacture a triboelectric generating device of Example 1.

Next, while the second electrode was covered with a PTFE sheet, the second electrode was vibrated transversely. An amplitude and a frequency of vibration were 30 mm and 2 vibrations/sec, respectively. After 10 minutes of vibration, a potential difference between the first electrode and the second electrode was measured.

Example 2-5 Parts by Weight of Inorganic Particles (Based on 100 Parts by Weight of Polymer Matrix)

A triboelectric generating device of Example 2 was manufactured in the same manner as in Example 1, except that 0.04 g of barium titanate (BaTiO$_3$) was used. Next, in the same manner as in Example 1, a potential difference between a first electrode and a second electrode was measured.

Example 3-20 Parts by Weight of Inorganic Particles (Based on 100 Parts by Weight of Polymer Matrix)

A triboelectric generating device of Example 3 was manufactured in the same manner as in Example 1, except that 0.16 g of barium titanate (BaTiO$_3$) was used. Next, in the same manner as in Example 1, a potential difference between a first electrode and a second electrode was measured.

Example 4-40 Parts by Weight of Inorganic Particles (Based on 100 Parts by Weight of Polymer Matrix)

A triboelectric generating device of Comparative Example 1 was manufactured in the same manner as in Example 1, except that 0.32 g of barium titanate (BaTiO$_3$) was used. Next, in the same manner as in Example 1, a potential difference between a first electrode and a second electrode was measured.

Example 5-60 Parts by Weight of Inorganic Particles (Based on 100 Parts by Weight of Polymer Matrix)

A triboelectric generating device of Comparative Example 1 was manufactured in the same manner as in Example 1, except that 0.48 g of barium titanate (BaTiO$_3$) was used. Next, in the same manner as in Example 1, a potential difference between a first electrode and a second electrode was measured.

Example 6-80 Parts by Weight of Inorganic Particles (Based on 100 Parts by Weight of Polymer Matrix)

A triboelectric generating device of Comparative Example 1 was manufactured in the same manner as in Example 1, except that 0.64 g of barium titanate (BaTiO$_3$) was used. Next, in the same manner as in Example 1, a potential difference between a first electrode and a second electrode was measured.

Comparative Example 1-0 Part by Weight of Inorganic Particles (Based on 100 Parts by Weight of Polymer Matrix)

A triboelectric generating device of Comparative Example 1 was manufactured in the same manner as in Example 1, except that 0 g of barium titanate (BaTiO$_3$) was used. Next, in the same manner as in Example 1, a potential difference between a first electrode and a second electrode was measured.

Figure 5:
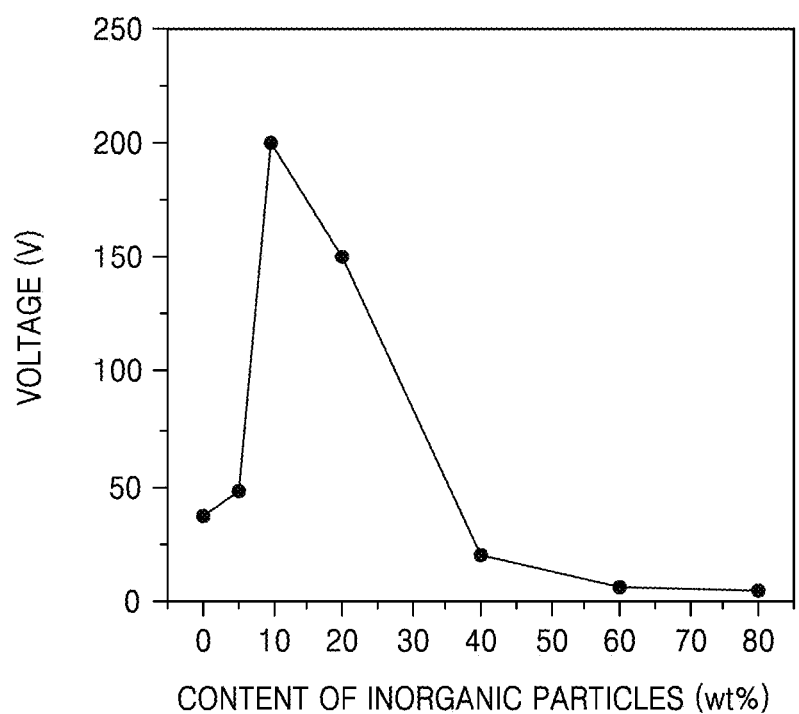
FIG. 5 is a graph showing results of measuring potential differences of Examples 1 to 3 and Comparative Examples 1 to 4.

The results of measuring potential differences of Examples 1 to 6 and Comparative Example 1 are shown in FIG. 5.

The invention claimed is:

1. A triboelectric generating device, comprising:
a first electrode;
a first charging layer formed on the first electrode; and
a second electrode disposed on the first charging layer, wherein the first charging layer and the second electrode are arranged such that an interface between the first charging layer and the second electrode forms a frictional interface, and
the first charging layer comprises a ferroelectric polymer matrix and ferroelectric inorganic particles dispersed in the ferroelectric polymer matrix.

2. The triboelectric generating device of claim 1, wherein the first electrode and the second electrode are each independently one or more selected from the group consisting of aluminum (Al), copper (Cu), magnesium (Mg), tungsten (W), iron (Fe), platinum (Pt), gold (Au), silver (Ag), tantalum (Ta), titanium (Ti), palladium (Pd), ruthenium (Ru), alloys thereof, carbon nanotube, graphene, ITO (indium tin oxide), tantalum nitride (TaN), titanium nitride (TiN), and conductive polymers.

3. The triboelectric generating device of claim 1, wherein the ferroelectric polymer matrix comprises one or more polymers selected from the group consisting of polyvinylidene fluoride (PVDF), polydimethylsiloxane (PDMS), polyimide, P(VDF-TrFE), P(VDF-TrFECFE), and P(VDF-HFP).

4. The triboelectric generating device of claim 1, wherein the ferroelectric inorganic particles comprise one or more selected from the group consisting of PZT (lead zirconate titanate), barium titanate (BaTiO$_3$), zinc oxide (ZnO), gallium nitride (GaN), aluminium nitride (AlN), PbTiO$_3$, triglycine sulfate ((NH$_2$CH$_2$COOH)$_3$·H$_2$SO$_4$), lithium tantalate (LiTaO$_3$), and lithium niobate (LiNbO$_3$).

5. The triboelectric generating device of claim 1, wherein an average particle size of the ferroelectric inorganic particles is 80 nm to 800 nm.

6. The triboelectric generating device of claim 1, wherein an amount of the ferroelectric inorganic particles in the first charging layer is 1 part by weight to 40 parts by weight, based on 100 parts by weight of the ferroelectric polymer matrix.

7. The triboelectric generating device of claim 1, wherein a thickness of the first charging layer is 0.01 μm to 300 μm.

8. The triboelectric generating device of claim 1, wherein a content of the ferroelectric inorganic particles in the first charging layer exhibits a gradient varying in a thickness direction of the first charging layer.

9. The triboelectric generating device of claim 8, wherein, as the distance from the frictional interface increases, a distribution of the ferroelectric inorganic particles in the first charging layer gradually increases from a sparse state to a dense state.

10. The triboelectric generating device of claim 8, wherein the first charging layer is a laminate of at least two sub-charging layers which have a different content of the inorganic particles from each other, and in this case, a sub-charging layer having a lowest content of the inorganic particles is disposed so as to form the frictional interface.

11. The triboelectric generating device of claim 10, wherein the content of the ferroelectric inorganic particles in the sub-charging layer having the lowest content of the inorganic particles is gradually increased from 0 parts by weight to about 40 parts by weight, based on 100 parts by weight of the ferroelectric polymer matrix of the corresponding sub-charging layer.

12. The triboelectric generating device of claim 10, wherein a thickness of the sub-charging layer having the lowest content of the inorganic particles is 0.01 μm to 300 μm.

13. The triboelectric generating device of claim 1, wherein the triboelectric generating device further comprises a second charging layer formed on the second electrode, the second charging layer comprises a second ferroelectric polymer matrix, and the first charging layer and the second charging layer are arranged such that an interface between the first charging layer and the second charging layer forms a frictional interface.

14. The triboelectric generating device of claim 13, wherein the second charging layer further comprises ferroelectric inorganic particles dispersed in the second ferroelectric polymer matrix.

15. The triboelectric generating device of claim 13, wherein the second charging layer is a laminate of at least two sub-charging layers which have a different content of the inorganic particles from each other, and in this case, a sub-charging layer having a lowest content of the inorganic particles is disposed so as to form the frictional interface.

* * * * *